Sept. 3, 1968  TOSHIKAZU MINYU ET AL  3,400,209
AEOLIAN VIBRATION DAMPER

Filed April 3, 1967  2 Sheets-Sheet 1

United States Patent Office 3,400,209
Patented Sept. 3, 1968

3,400,209
AEOLIAN VIBRATION DAMPER
Toshikazu Minyu, Jun Kato, and Takahisa Koguchi, Nikko, and Ryoichi Kobayashi, Imaichi, Japan, assignors to Furukawa Electric Company Limited, Tokyo, Japan
Filed Apr. 3, 1967, Ser. No. 628,123
Claims priority, application Japan, Apr. 6, 1966, 41/21,683
10 Claims. (Cl. 174—42)

ABSTRACT OF THE DISCLOSURE

This invention relates to an improved aeolian vibration damper to be used for preventing aeolian vibration of overhead transmission cables. The damper according to the invention is provided a pair of J-shaped weight members made of round metal rod or pipe, secured, by compression, to both ends of a resilient member made of stranded steel wire. The damper of the invention has an excellent vibration dissipating effect over a wide frequency range of the vibration of overhead transmission cable and has especially a remarkable feature of simple construction which may afford a great advantage of simple practice of manufacture and accordingly a low manufacturing cost.

Background of the invention

This invention relates to vibration dampers for overhead transmission lines or the like, more particularly to devices for preventing aeolian vibration of overhead electrical transmission cables, which occurs in the vertical direction when the wind blows across the cables.

Generally the aeolian vibration frequencies are known to be in a range of 10–50 c./s. by actual measurement. When the tension of an overhead cable is especially high, the vibration reaches as high as about 200 c./s. in some cases.

A damper of known type generally consists of a clamping member which clamps the overhead transmission cable, a resilient member usually made of stranded steel cable, the center of which is held by the clamping member, and a pair of inertia members or weight members which are secured at both ends of the resilient member. Said type of damper is used for damping the vibration of overhead transmission cable by securing it to the cable by means of the clamping member and in operation the damper vibrates with the overhead transmission cable and the vibrating energy of the transmission cable is dissipated in the resilient member by the bending, torsion and friction of the strands and by the movement of inertia members.

As the most popular dampers of this kind, "Stockbridge damper" and "Torsional damper" are known. However, these dampers have the following disadvantages:

(a) Damping effect for the low frequency range (10–20 c./s.) or the high frequency range (50 c./s. or over) is insufficient.

(b) The manufacture is troublesome, since the configuration of the inertia member or the weight member is complicated.

(c) The construction of the securing parts between the resilient member and the weights becomes complicated, since tapered split compression collets are required at the securing parts.

(d) High manufacturing cost owing to the above conditions.

Summary of the invention

The present invention is to mitigate the aforementioned disadvantages of the conventional dampers.

Therefore, an object of the present invention is to provide an improved damper having an excellent vibration dissipating effect over all range of vibrating frequency of the overhead transmission lines.

Another object of the invention is to provide an improved damper having very simple construction.

Another object of the invention is to provide an improved damper construction, especially to provide a construction of weight member suitable for easy manufacture.

Another object of the invention is to provide a simple means for establishing a rigid junction between the weight member and the resilient member.

Another object of the invention is to provide an improved damper of low manufacturing cost.

The outstanding feature of the damper according to the present invention is that a pair of weight members, each having a nearly J-shape configuration with shorter and longer linear portions, nearly parallel to each other, are secured at both ends of a resilient member.

The objects and advantages of the present invention will more fully be understood by the following description with reference to a preferred embodiment of the invention shown in the accompanying drawings.

Description of preferred embodiments

Figure 1:
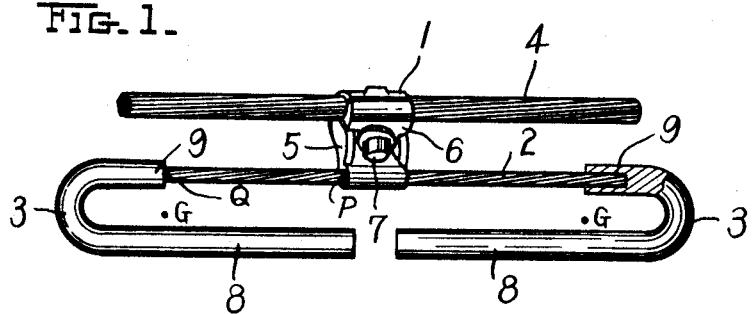
FIG. 1 shows partly sectioned front view of an embodiment of damper according to the invention, which is clamped to an overhead transmission cable.
Figure 2:
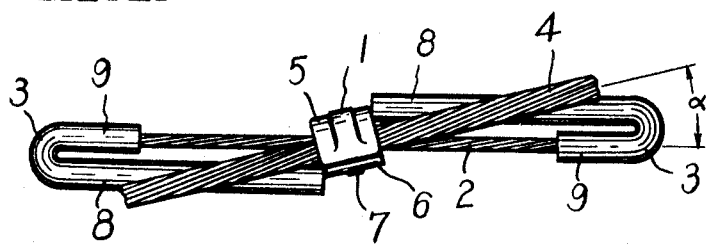
FIG. 2 is a plan view of the damper shown in FIG. 1.
Figure 3:
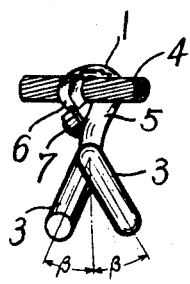
FIG. 3 is a side view of the damper shown in FIG. 1.

FIGS. 1 to 3 show the construction of the damper according to the invention. The damper according to the invention consists of a clamp 1, an elongated resilient member 2 and a pair of weights 3.

The clamp 1 is used to secure the damper on overhead transmission cable 4 and consists of a hook-shaped clamp body 5 and a clamp arm 6, which is adjustable against the clamp body 5 in order to securely clamp the cable 4. A securing screw bolt 7, extending through the arm 6 into threaded engagement with an aperture in the clamp body 5, serves to securely fasten the overhead transmission cable by the clamp arm 6 and clamp body 5. A through hole is provided at the bottom part of the clamp body 5, into which an elongated resilient member 2 is inserted. At about the center portion of the resilient member 2, the clamp body 5 and the resilient member 2 are fixedly secured by compression. Usually stranded steel wire is used for the resilient member 2.

Said resilient member 2 is so secured by clamp 1 as to extend in a direction having a certain angle α against the direction of the overhead transmission cable 4. By this arrangement it is possible to avoid contact between a plurality of dampers fixed in a close proximity to one another on an overhead transmission cable. However, the damper according to the present invention is not limited to an embodiment having this angle α in a specific range. It is also possible to extend the resilient member parallel to the overhead transmission cable.

A pair of weights 3 are secured at both ends of the resilient member 2. The weight 3 has a configuration of nearly J-shape and comprises a longer linear part 8 and a shorter linear part 9 extending nearly parallel to each other. The longer linear part 8 is effective in increasing the deformation of the resilient member 2 because it moves towards and away from the resilient member 2 when the damper is subjected to vibration. Also the shorter linear part 9 helps to increase such movement of the longer linear part 8, while the part 9 functions as a junction for securing the weight 3 to the resilient member 2.

Figure 4:
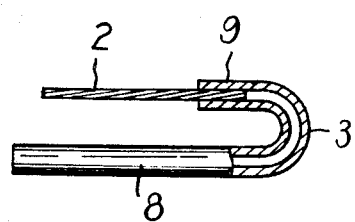
FIG. 4 shows partly sectioned front view of part of damper of slightly modified embodiment of the invention.

It is most effective to bring the center of gravity G of the weight member 3 near the end of shorter linear part 9 from a viewpoint of damping characteristics. The weight 3 may consist of rod or pipe made of metals, such as steel, iron, copper, brass or the like. It is especially convenient to use commercial steel rod or steel pipe in view of the manufacturing cost. When a metal rod is used for the weight 3, the shorter linear part 9 must have a coaxial aperture provided at the end so that the end of the resilient member 2 may be inserted into it to secure the weight 3 to the resilient member 2. In case a metal pipe is used for the weight 3 as shown in FIG. 4, the inner diameter of the metal pipe should be slightly larger than the outer diameter of the resilient member 2.

In order to secure the weight members at both ends of the resilient member 2, each end of the resilient member is inserted into the aperture provided at the end of shorter linear part of the weight 3 and the part is compressed from outside to establish a rigid junction. Usually the weight members 3 are arranged on both sides of the resilient member 2 in such a manner that planes including respective weights 3 are arranged symmetrically against a vertical plane passing through the axis of resilient member 2. This relation may be more clearly shown in FIG. 3, in which both weights are arranged symmetrically at an oblique angle below the resilient member. By this arrangement it is possible to cause alternative torsional motion to the resilient member 2 when the damper is subjected to vibration in the vertical direction.

The angle between the plane including weight 3 and the vertical plane passing through the axis of the resilient member 2, namely, the securing angle $\beta$ of weight 3 as shown in FIG. 3, is determined in consideration of the vibration characteristics of an overhead transmission cable, for which vibration prevention is intended. Since overhead cables in general vibrate at a frequency of 10 to 50 c./s., it is preferable to make the securing angle $\beta$ 10° to 40°. In the case of an overhead cable of small conductor size installed under a high tension, its vibration frequency becomes 50 to 100 c./s., or as high as 200 c./s. in some cases. As it is not very necessary to dissipate vibration energy of this kind of cable by torsion of weight 3, the securing angle of weight 3 is made smaller, less than 10°. According to actual measurement, if the angle is large, for instance, 45°, the damper effectively dissipates vibration energy of a low frequency, 30 c./s. or under, but is less effective in dissipating vibration energy of a high frequency, about 50 c./s., than in cases where its weights are fitted at an angle of 10°.

On the contrary, when an overhead cable has a large conductor and is installed under a low tension, its vibration frequency becomes as low as 20 c./s. or under. In such case, the vibration energy of the cable must effectively be dissipated by torsion of weight 3. It is therefore necessary to make the securing angle $\beta$ of weight 3 larger, about 90°.

As above explained, the damper of the invention can be made conformable to the vibration characteristics of the overhead transmission cable through selection of a suitable securing angle $\beta$ of weight 3 within a range of 0° to 90°.

The typical vibration system of the aforesaid damper is considered to consist of the following items. For the sake of simplification, only a half of the damper is considered.

(a) vertical vibration of the whole weight member and the resilient member, with a fulcrum at the clamp securing point P.

(b) Vibration of weight member, with a fulcrum in the vicinity of securing point Q, namely, vibration of the end of longer linear part of the weight member, moving towards and away from the resilient member.

(c) Torsional vibration of the weight member about the axis of the resilient member, giving a torsional stress to the resilient member.

The actual vibration of the damper is a resultant motion of the abovementioned vibrations and it shows a very complicated mode of vibration. The abovementioned three kinds of vibrations have different natural frequencies.

In case the pair of weight members and resilient members are arranged symmetrically both sides of the clamp, the damper has, as a whole, three different kinds of natural frequencies. If, however, these members are arranged asymmetrically in respect to the clamp, namely, if a portion of the resilient member on one side of the clamp differs in length from a portion on the other side, or if the two weight members differ from each other in weight and fixing angle, the damper has, as a whole, six different kinds of natural frequencies. In this case it is preferable to adjust the weight of weight members according to the different lengths of such portions of the resilient member so that the moment of the damper may become the same on both sides of the clamp. By this arrangement a static balance of the clamp is obtained, thereby making it possible to avoid unbalanced stress in the overhead transmission cable.

When the aeolian vibration frequency of the overhead cable coincides with the natural frequency of the damper, the damper vibrates with a comparatively large amplitude by a resonance phenomenon. When the damper vibrates strongly, the bending and torsion of the resilient member, the friction of strands, and the movement of weight members are increased so that the dissipation of vibrating energy increases accordingly.

However it should be noted that the damper according to the invention has excellent vibration dissipating effect not only in the vicinity of the natural frequencies but also in any other frequency range.

Since the damper according to the invention utilizes a J-shaped bending metal rod or the like as the weight member, the mass of the weight does not concentrate in the vicinity of securing point Q, and is distributed substantially continuously along the resilient member. Accordingly, when compared with the conventional type Stockbridge damper or torsional damper, the damper according to the present invention has less possibility of the vicinity of securing point Q becoming sole node of vibration. The node of vibration of the damper according to the invention may move freely along the resilient member, shorter linear part of the weight member, or the bent portion of the weight member, according to the vibration frequency. This means that almost any kind of vibration wave may occur in the resilient member. In other words the resilient member and the weight member may vibrate at any frequency according to the vibration of overhead transmission cable. Therefore the damper according to the present invention has a superior vibration damping effect for the vibration of overhead transmission cable occurring at any range of frequencies.

Figure 5:
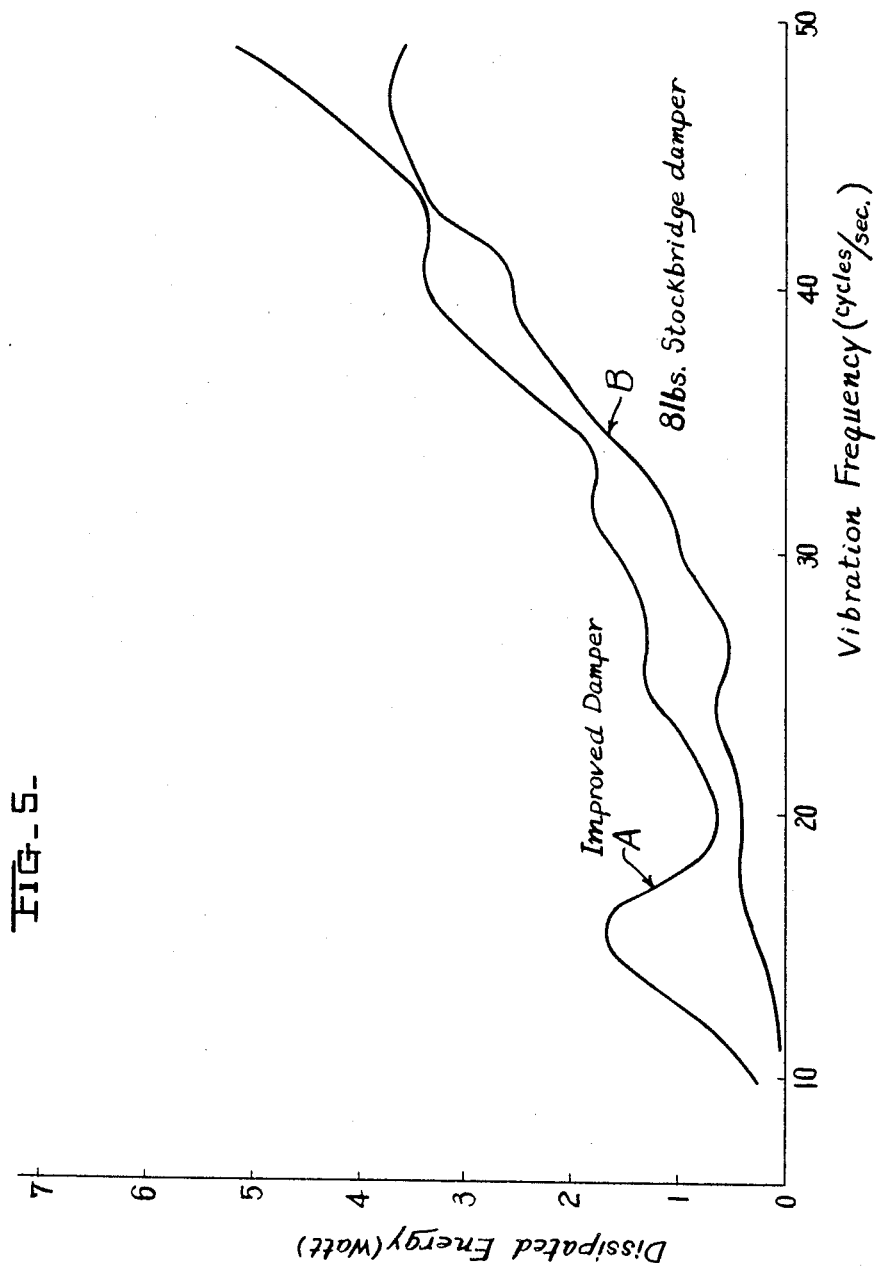
FIG. 5 is a graph illustrating dissipation energy curve of damper according to the invention and that of the damper of conventional type.

FIG. 5 shows a diagram illustrating the vibration energy dissipating characteristic of the damper (securing angle $\beta=20°$) according to the invention in line A and that of the Stockbridge damper in line B. Both of the abovementioned dampers weigh substantially the same, 3.97 kg. A conventional standard type Stockbridge damper, having an overall weight of 3.97 kg., is called "nominal 8 lbs. Stockbridge damper." The curves in FIG. 5 show the vibration energy dissipated by the damper of the invention and the Stockbridge damper, which were fitted 1 meter from one fixed end of 120 mm.$^2$ ACSR (Aluminum Conductor Steel Reinforced) strung over a 40 meter span under a tension, 20% of its ultimate strength, when vibrations were given the cable by an electromagnetic shaker provided at the other end of the cable at frequencies changed gradually from 10 to 50 c./s. while the double amplitude was kept at 3 mm. As is clearly shown in FIG. 5, the damper according to the invention has a remarkably superior vibration dissipating characteristics over the entire range of the vibrating frequencies when compared with a Stockbridge damper of the same weight. Especially in the low frequency range of 10–20 c./s., the vibration absorbing effect of the damper according to the invention is several times that of the conventional Stockbridge damper.

The inventors also ascertained that a damper made for trial according to the invention, having substantially the same vibration dissipating effect as that of the nominal 8 lbs. Stockbridge damper, weighing 3.4 kg., about 14% less than the nominal 8 lbs. Stockbridge damper.

As fully explained above the present invention offers a damper having an excellent vibration dissipating effect over a wide frequency range of aeolian vibration of overhead transmission cables or the like. Especially, the damper according to the present invention may be constructed by using a weight member constructed from commercial steel rod or steel pipe, therefore the damper has a great advantage of simple construction, easy manufacture and accordingly a low cost.

The weight member and the resilient member according to the invention are secured together by compression so that the joint is very strong and durable in many years of use.

What we claim is:

1. An aeolian vibration damper comprising a clamp, which secures the damper to an overhead transmission cable, a resilient member, of which the middle portion is held by the clamp, and a pair of weight members secured at both ends of the resilient member, wherein each weight member is constructed in J-shape configuration having a shorter linear part and a longer linear part arranged parallel to each other, and both ends of the resilient member are inserted coaxially into the shorter linear part of the weight members, the end of the resilient member and the shorter linear part of the weight member being rigidly secured by compression.

2. An aeolian vibration damper as claimed in claim 1, wherein weight members are arranged in such a manner that a plane including one weight member and a plane including the other member are symmetrical to each other in respect to the vertical plane passing through the central axis of the resilient member.

3. An aeolian vibration damper as claimed in claim 1, wherein weight members are arranged in such a manner that a plane including one weight member and a plane including the other member are asymmetrical to each other in respect to the vertical plane passing through the central axis of the resilient member.

4. An aeolian vibration damper as claimed in claim 1, wherein the angle between a plane including the weight member and a vertical plane passing through the central axis of the resilient member is between 0°–90°, preferably 10°–40°.

5. An aeolian vibration damper as claimed in claim 1, wherein the weight member is so constructed that its center of gravity is located in the proximity of the end of its shorter linear part.

6. An aeolian vibration damper as claimed in claim 1, wherein the resilient member of the damper is so supported by the clamp as to cross the overhead transmission cable.

7. An aeolian vibration damper as claimed in claim 1, wherein the lengths of the resilient member divided by the clamp and the weights of weight members respectively differ from each other and are so adjusted as to ensure equal moments on both sides of the clamp.

8. An aeolian vibration damper as claimed in claim 1, wherein a round metal bar is used as the material of the weight member.

9. An aeolian vibration damper as claimed in claim 1, wherein a metal pipe is used for the weight member.

10. An aeolian vibration damper comprising a clamp, which secures the damper to an overhead transmission cable, a resilient member, of which the middle portion is held by the clamp, and a pair of weight members secured at both ends of the resilient member, wherein each weight member is constructed by a J-shaped round metal bar having a shorter linear part and a longer linear part arranged nearly parallel to each other, and both ends of the resilient member are inserted coaxially into the shorter linear part of the weight members, the ends of the resilient member and the shorter linear part of the weight members being rigidly secured by compression, and the angles between planes including the respective weight members being made symmetrical to each other in respect to a vertical plane including the resilient member and selected between 10°–40°, preferably 20°, and that the center of gravity of the weight member lies in the proximity of the end of the shorter linear part of the weight member.

References Cited

UNITED STATES PATENTS

| | | | |
|---|---|---|---|
| 1,675,391 | 7/1928 | Stockbridge | 174—42 |
| 1,992,538 | 2/1935 | Monroe et al. | 174—42 |
| 2,688,047 | 8/1954 | MacIntyre | 174—42 |
| 3,052,747 | 9/1962 | Clark et al. | 174—42 |

LARAMIE E. ASKIN, *Primary Examiner.*